W. R. HOSE.
AIR VALVE.
APPLICATION FILED JUNE 5, 1916.

1,226,664. Patented May 22, 1917.

WITNESSES
Roland T. Williams
A. P. Hollingsworth

INVENTOR
Walter R. Hose
BY Richard Owen

UNITED STATES PATENT OFFICE.

WALTER R. HOSE, OF NEW ULM, MINNESOTA.

AIR-VALVE.

1,226,664.

Specification of Letters Patent.

Patented May 22, 1917.

Application filed June 5, 1916. Serial No. 101,834.

*To all whom it may concern:*

Be it known that I, WALTER R. HOSE, a citizen of the United States, residing at New Ulm, in the county of Brown and State of Minnesota, have invented certain new and useful Improvements in Air-Valves, of which the following is a specification.

This invention relates to an improvement in air valves for automobile tires and has for its object to provide means for securing the valve stems to the inner tubes of such tires, and more particularly to means whereby the stem may be quickly and securely attached to the tube without the necessity of running the fastening nut on the stem from one end to the other as is the present practice.

Another object of the invention is to provide means on the stem and also on the washer between the nut and the tube whereby said washers are prevented from rotating about the stem while the nut is being tightened and also to prevent said washers from being misplaced or getting out of position.

Figure 1:
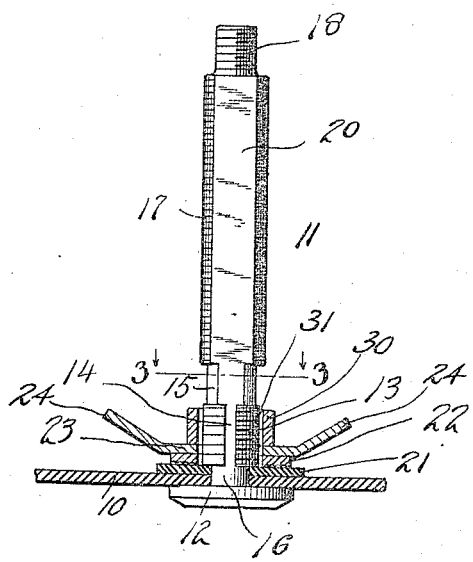
Figure 2:
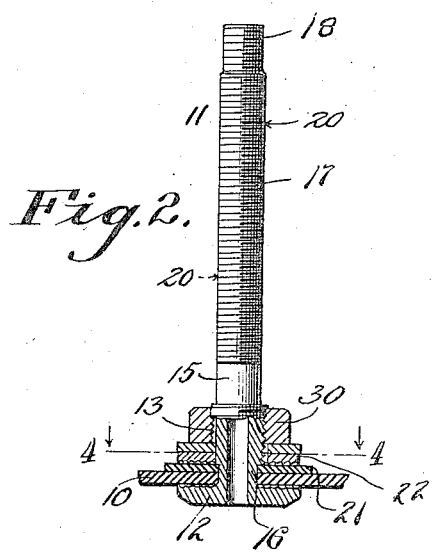
Figure 3:
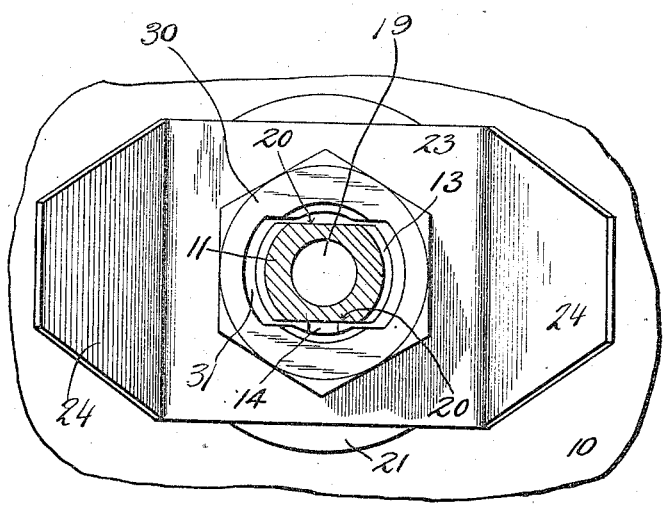
Figure 4:
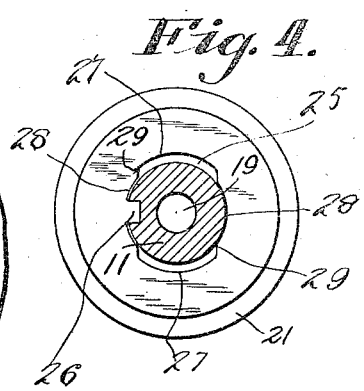

With these as the principal objects in view and others of minor importance to be set forth later, the invention consists of the novel construction and combination of parts now to be described and illustrated in the accompanying drawings, in which:

Figure 1 is an elevation partly in section of the improved valve stem attached to a portion of the inner tube of a tire, Fig. 2 is a similar view at right angles to Fig. 1, Fig. 3 is a horizontal sectional view on the line 3—3 of Fig. 1 much enlarged, and, Fig. 4 is a sectional view on the line 4—4 of Fig. 2 slightly enlarged.

Referring to the drawing by numerals, 10 indicates a portion of the inner tube of a pneumatic tire through an opening in which projects the stem 11 of an air valve by means of which air may be introduced into the tire and retained therein by the closure of the valve. On the inner end of the valve stem is an enlarged head 12 having a corrugated outer surface that bears against the internal face of the tube 10. The valve stem 11 immediately adjacent the head 12 is of reduced diameter as at 16 forming a neck beyond which is a limited threaded portion 13 of slightly greater diameter having a longitudinal slot 14 extending from end to end thereof in its peripheral surface. Beyond or exterior to the threaded portion 13 is a second reduced portion 15 of somewhat greater diameter than the neck 16 and preferably a little longer. From the reduced portion 15 nearly to the end of the stem 11, said stem is provided with an exterior screw thread 17, which threaded portion is substantially of the same diameter as the threaded portion 13, but of a finer pitch.

The stem 11 terminates at its outer end with a reduced threaded extremity 18 upon which is screwed a cap, not shown, which prevents entrance of dust and dirt into the bore 19 of the valve stem. The threaded extremity 18 also serves for the attachment of the coupling of the inflating tube when air is to be forced into the tire.

On diametrically opposite sides of the valve tube 11 from the extremity 18 to the threaded portion 13 are flat parallel surfaces 20 formed by cutting away the sides of the valve stem leaving two smooth faces as shown clearly in Figs. 1 and 2.

The neck 16 of the valve stem projects through a circular opening in the inner tube 10 and also through a similar opening in a flexible washer 21 that lies against the outer side of the inner tube. These two parts practically fill the space between the head 12 and the threaded portion 13 over which latter portion in turn is placed a circular metal washer 22 and an elongated clamping plate 23 having upturned ends 24 as is common in tire valves. The washer 22 and the plate 23 each having an opening therethrough as shown at 25, Fig. 4, of such shape and size as to slide freely the full length of the valve stem and each is provided with a lug 26 projecting inwardly from one side of the opening 25 to engage with the longitudinal slot 14 in the threaded portion 13 of the valve stem. The opening 25 both in the washer 22 and plate 23 is slightly longer in one direction than in a direction at right angles thereto, the ends of the slot in the longer direction being curved on the axis of the valve stem as shown at 27 and slide freely over the threaded portions 13 and 17 of the stem when these members are placed in position. The sides 28 of the opening 25 are arcuate but have a shorter diameter although sufficiently great to pass over the threads of the portion 13. From the center of one of said sides 28 the lug 26 projects inwardly. The sides 28 and ends 27 of the opening 25 are connected by straight shouldered portions 29, spaced apart a distance to permit an easy movement of the washer and plate over the flat surfaces 20 of the valve stem.

A nut 30 having an elongated opening therethrough of a size to permit it sliding freely over the threaded portion 17 of the valve stem 11 but engaging with the threads of the portion 13 serves to clamp the several parts on the tube 10. The opening 31 through the nut is substantially the same shape as the opening 25 in the washer 22, its length being the same and having similarly curved ends. The width however is less than the arcuate sides 28 of the opening 25 to permit threads to be cut therein so as to engage the threaded portion 13.

In securing the valve stem in place the same is passed through the opening in the inner tube 10 until the head 12 is seated against the inner surface thereof, after which the flexible washer 21 is slipped in place followed by the metal washer 22 and plate 23, the lugs 26 on said members 22 and 23 entering the slot 14 in the threaded portion 13 and prevent rotation of said members. The nut 30 is now placed upon the stem and the opening 31 therein being sufficiently large to slide over the threaded portion 17 and flat surfaces 20, the nut is easily pushed downwardly until it engages the threaded portion 13 with which the threaded surfaces of the inner face of the opening 31 engage and the nut by relatively few turns is seated upon the plate 23 and by turning said nut with a wrench the parts are drawn closely together and the corrugated surface on the inner side of the washer 22 forms an air-tight connection between the valve stem and the inner tube.

The valve itself may be of any well known type and is seated with the stem 11. No claim however being made on the valve the same has not been illustrated nor described.

While I have shown and described what I consider the best form of my invention now known to me, it is to be understood that various changes may be made in the construction and arrangement of the several parts without departing from the spirit of this invention.

I claim:

1. In a tire valve, a stem having a thread on its outer end and a head on its inner end, a second threaded portion on the stem near said head, and spaced from the outer threaded portion, a longitudinal slot extending from end to end of said second threaded portion, a washer and a clamping plate each having an opening therethrough to permit its sliding freely over the outer portion of the valve stem and having inwardly projecting lugs to engage said longitudinal slot, and a nut also sliding freely over the outer threaded portion of the stem but adapted to screw upon said second threaded portion and clamp said plate and washer against a tire.

2. In a tire valve, a hollow stem having a head on one end and threaded for the greater portion of its length, said threaded portion having oppositely disposed flat surfaces on its sides and extending throughout its length, a second threaded portion between the outer portion and said head and spaced from both, a longitudinal slot being cut in said threaded portion from end to end, a washer and a clamping plate each having an inwardly projecting lug to engage said slot and prevent rotation, and a nut having a central opening of a size to permit said nut passing freely over the outer threaded end of the stem but adapted to engage with the inner threaded portion to clamp said plate and washer in connection with said head upon a tire.

3. In a valve for tires, a stem having a head on one end and a threaded portion spaced a short distance from said head having a longitudinal slot formed therein and extending from end to end, a second threaded portion spaced from the first and continuing to the end of the valve stem, oppositely disposed flattened surfaces on the sides of the extended threaded portion, a washer and a clamping plate slidable freely over the threaded stem and each having a lug to engage said longitudinal slot to prevent their rotation, and a nut having an elongated slot therethrough adapted to slip freely over the outer portion of said stem and having threaded depressions in the opposite longer walls of said slot to engage the threaded portion of the stem near the head and lock said washer and clamping plate in position.

In testimony whereof I affix my signature in presence of two witnesses.

WALTER R. HOSE.

Witnesses:
Z. G. SHANER,
M. M. COONEY.